Patented Mar. 22, 1949

2,464,821

UNITED STATES PATENT OFFICE 2,464,821

METHOD OF PREPARING A SURFACE FOR SOLDERING BY COATING WITH INDIUM

Maria T. Ludwick, Douglaston, and William S. Murray, Utica, N. Y., assignors to The Indium Corporation of America, a corporation of New York No Drawing. Application August 3, 1942, Serial No. 453,466

2 Claims. (Cl. 113—112)

This invention relates to brazing or soldering, and has for its principal object to provide for increasing the ability of a molten brazing or soldering alloy to wet the surface of metals of higher melting points. The invention further contemplates the provision of an improved method for brazing or soldering metal surfaces to be joined, and the provision of an article having an improved brazed or soldered joint.

Brazed or soldered joints are made by placing the surfaces to be joined in proper relation to each other, and applying to such surfaces a molten brazing or soldering alloy. The alloy adheres to the metal surfaces to be joined, and upon solidifying firmly bonds these surfaces together.

The term "soldering" in its generic sense refers to the making of all types of joints with all manners of alloys usable in the foregoing manner. In a more restricted sense, the term "soldering" has come to refer to the making of joints as above-described with a joining alloy of low melting point, as, for example, an alloy of lead; and the term "brazing" is commonly applied to the making of such joints with a joining alloy of relatively high melting point, such, for example, as a copper-base alloy. In some instances the terms "brazing" and "soldering" are used interchangeably, especially when using silver-base joining alloys. Such joining alloys are referred to, for example, either as brazing alloys or as hard solders. In this specification recognition is given to the above-noted different usages of the terms "brazing" and "soldering," but the term "soldering" is also used herein in its generic sense to include operations customarily referred to in the art as "brazing."

It is essential, in order to produce a good brazed or soldered joint, that the brazing or soldering alloy adhere well and uniformly to the metal surfaces to be joined. This is accomplished only if the molten brazing or soldering alloy thoroughly wets the surfaces to which it is applied for the purpose of joining them. In fact, the thoroughness with which the brazing or soldering alloy wets the metal surfaces to which it is applied is a more or less direct measure of the firmness with which the alloy adheres to such surfaces, and hence of the soundness of the joint. If the metal surfaces to be joined are contaminated with oil, grease, or the like, or with oxides or other non-metallic surface impurities, the soldering or brazing alloy will not effectively wet the metal, and the joint in consequence will be weak. For this reason it is customary in making brazed or soldered joints to employ a flux, such as borax, acidified zinc chloride solution, or other agent capable of chemically cleaning the surfaces and so placing them in the best possible condition to receive the molten soldering or brazing alloy.

It is also necessary that the soldering or brazing alloy itself be capable of easily wetting the metal surfaces to which it is applied in the molten state. If it wets such surfaces imperfectly, the joint will be weak because of the resulting imperfect adherence of the brazing or soldering alloy. The use of brazing or soldering alloys which are not capable of easily and thoroughly wetting clean surfaces to be joined therefore requires considerable time for making the joint and often results in imperfect joints.

We have discovered that the ability of molten brazing and soldering alloys to wet metal surfaces to be joined may be substantially increased by incorporating metallic indium in the brazing or soldering alloy. Based on this discovery, the present invention provides an improved method for increasing the ability of a brazing or soldering alloy to wet the surface of a metal having a higher melting point than the alloy, which comprises incorporating metallic indium in the brazing or solder alloy. Generally speaking, from 0.5% to 25% of metallic indium may be used in the alloy effectively for this purpose. In many cases, an indium content of 1% to 5% in the brazing or soldering alloy is most satisfactory. These percentages and others given throughout this specification are by weight of the alloy.

Inasmuch as brazing or soldering alloys are commonly composed chiefly of a non-ferrous metal, the invention particularly contemplates the inclusion of indium in non-ferrous brazing or soldering alloys to increase the ability of such alloys to wet metal surfaces. In particular the invention contemplates the inclusion of indium in brazing or soldering alloys comprising largely a metal of the group consisting of lead, copper, and silver, as such alloys are most commonly used for brazing and soldering purposes. The indium may, however, be incorporated in other brazing or soldering alloys to increase their ability to wet metal surfaces.

The invention further contemplates the method of joining two or more metal surfaces by a brazing or soldering operation which comprises applying to said surfaces when in proper position relative to each other a molten indium-containing alloy made as described above. In addition, the invention contemplates the provision of an article having an improved brazed or soldered joint, in which the brazing or soldering alloy at the joint contains indium. The scope of the invention of course includes, in the art of soldering or brazing, a brazing or soldering alloy made as described above and containing indium in an amount effective for increasing the ability of the alloy to wet surfaces to be joined.

Although the invention is applicable generally to alloys for brazing and soldering, and to the use of such alloys generally in the making of brazed or soldered joints, it is described below by way of example with particular reference to several exemplary brazing and soldering alloys.

A common alloy used for low-temperature soldering is composed of lead together with a substantial percentage of tin. The inclusion of tin in the alloy lowers its melting point and also increases its ability to wet and so adhere to surfaces to be soldered together. Various attempts have been made to substitute other metals for the tin, but without notable success, because other lead-base alloys do not effectively wet and adhere to many industrially used metals.

The most promising of the tin-free solders have been composed of lead and silver, with or without small additions of other metals. The chief drawback to lead-silver alloys for soldering purposes is their inability, in the molten state, to wet other metal surfaces effectively. For example, an alloy containing 3% silver and the balance essentially lead, when in the molten condition, spreads with difficulty on other non-ferrous surfaces and with even greater difficulty on ferrous surfaces, and often accumulates on such surfaces in the form of weakly-adhering lumps even when a good soldering flux is carefully employed. A joint between the two flat metal surfaces formed by soldering with this alloy is relatively weak, having a tensile strength of the order of 2400 pounds per square inch.

In contrast, an alloy composed of 3% silver, 1% indium, and the balance essentially lead has been found to spread easily and smoothly on both ferrous and non-ferrous metal surfaces, indicating that the alloy thoroughly wets such surfaces. A joint between two flat surfaces made with this indium-containing alloy in the same manner as the afore-mentioned joint made with the lead-silver alloy was found to have a tensile strength substantially in excess of 3000 pounds per square inch, an increase upwards of 25%. An alloy containing 3% silver, 2% indium, and the balance essentially lead spreads, when in the molten condition, even more easily than the alloy containing 1% of indium, on both ferrous and non-ferrous metal surfaces, indicating that it wets such surfaces even more readily. A joint made between two flat surfaces with this latter indium-containing alloy was found to have a tensile strength upwards of 4000 pounds per square inch. The melting point of the above-described indium-containing alloy is about 590° F. This melting point is of the same order as the melting point of the common lead-tin and lead-silver solders, so that the improved alloys may be used effectively in the same manner and with the same soldering apparatus commonly used for soldering with lead-tin alloys.

An alloy quite commonly used for relatively high temperature brazing is composed of about 72% silver and about 28% copper. This alloy (known also as a hard silver solder) may be used fairly effectively for joining non-ferrous metal surfaces, but it does not effectively wet ferrous metal surfaces and may not be used to produce strong joints between ferrous metal surfaces, or between a ferrous surface and a non-ferrous surface. Examination of a brazed joint made between steel surfaces with this copper-silver brazing alloy revealed that 50% of the surface of the steel covered by the brazing alloy at the joint was unwetted by the brazing alloy and therefore non-adherent thereto. In contrast, an alloy containing 28% copper, 2% indium, and 70% silver was found to have the property, in the molten condition, of thoroughly and easily wetting not only non-ferrous but also ferrous metal surfaces. A brazed joint between steel surfaces made with this alloy reveals, upon examination, that the steel is virtually completely wetted by and adherent to the brazing alloy.

An alloy composed of 95% copper and 5% silver may be used fairly effectively for joining ferrous metal surfaces by brazing, if employed in conjunction with a good flux. However, by incorporating indium in the composition to produce an alloy containing 5% indium, 5% silver, and the balance copper, the alloy in the molten state is made to wet both ferrous and non-ferrous metal surfaces even more easily than the indium-free alloy. The addition of this amount of indium to the alloy also materially increases its hardness, which for some purposes is highly desirable.

Commercially pure silver is unsatisfactory for brazing or soldering purposes, because of the reluctance with which silver wets any of the common base metals, and particularly ferrous metals. It has been found that an alloy composed approximately of 92% silver and 8% indium wets not only non-ferrous but also ferrous metal surfaces easily and thoroughly, and the alloy may therefore be used with common brazing fluxes for making sound brazed joints in either ferrous or non-ferrous metal articles.

The difficulty of brazing or soldering with an aluminum-base alloy is well known. Heretofore no effective method for soldering or brazing other metal surfaces with aluminum alloys has been known. We have discovered, however, that good soldered joints may be produced using an alloy composed of about 75% aluminum and about 25% indium. This alloy is very soft, but may be used to produce fairly good brazed joints whenever its softness and other properties are desired.

Gold has been used for special brazing operations when its physical and chemical properties are desired, but it possesses a rather high melting point and does not always easily wet the surface to be brazed. On the other hand, an alloy of 85% gold and 15% indium has been found to be an excellent brazing alloy. Its melting point is substantially lower than that of gold (being about 850° F.), but it possesses the properties of gold so far as resistance to chemical attack, non-volatility, and the like are concerned. It easily wets metal surfaces to which it is applied, and so is effective for brazing purposes.

The foregoing examples for brazing and soldering alloys produced in accordance with the invention are by way of example only, and it is understood that other brazing and soldering alloys may be produced in accordance with the invention by the addition of indium to a base metal composition.

In making brazed joints in accordance with the invention, the parts to be joined are arranged in proper position relative to each other, and the molten brazing or soldering alloy is applied by any convenient means. Perhaps the most common method is to heat the parts to be joined with a torch or with a soldering iron, and to melt the brazing alloy in close proximity to the joint by means of the torch or the iron. The molten alloy thus is caused to flow into the joint and to unite the parts to be joined.

Other methods of applying the brazing or soldering alloy also may be employed. For example, one or both of the surfaces to be joined may be coated with a thin film of the brazing or soldering alloy, and the surfaces may then be heated to above the melting temperature of the alloy, and at the same time, may be pressed together. When the parts have cooled sufficiently for the alloy to have solidified, the joint is completed.

Any of the common soldering or brazing fluxes may be used to facilitate the making of joints in the manner described.

Still another method of brazing or soldering in accordance with the invention involves applying to the metal surface a film of metallic indium, and then causing an indium-free brazing or soldering metal to flow in the molten condition over the indium-coated surface. The indium film promptly alloys with the molten metal, forming an indium-containing alloy therewith, and the resulting alloy easily wets and adheres to the surface of the metal with which it is in contact. Often no flux is necessary if this soldering or brazing procedure is employed.

The making of electrotype affords an example of soldering by this method. The usual procedure in the manfacture of electrotype involves electrodepositing copper on the conducting surface of a type impression, and thereafter pouring a molten lead-base alloy into the back of the electrodeposited copper film to produce a mechanically strong block of electrotype. It is important that the lead alloy adhere well to the back of the electrodeposited copper film, and for this purpose it has been customary in the past to apply a soldering flux to the back of the copper and to lay over it a sheet of tin. The present invention contemplates the improvement which comprises electrodepositing a thin film of metallic indium on the back of the electrodeposited copper, and then pouring the lead-base backing alloy thereon. The indium film promptly alloys with the lead backing, forming at least at the interface between the backing and the copper an indium-containing lead alloy which easily wets and strongly adheres to the copper. In general, no soldering flux is necessary to secure a strong soldered bond by this improved method between the backing metal and the copper type face, although a flux may be employed if desired.

Articles having brazed or soldered joints properly made in accordance with the invention are characterized by the uniformity and completeness with which the brazing or soldering alloy has wetted and adhered to the joined surfaces, and in consequence by the soundness of the brazed joint.

We claim:

1. The method of making a brazed or soldered joint which comprises applying a thin film of metallic indium to metal surfaces to be joined, applying to the indium-coated surfaces a molten indium-free lead-base alloy composed of 3% silver and the balance essentially lead and with which the metallic indium alloys in situ, and solidifying the resulting indium-silver-lead alloy while in contact with said metal surfaces.

2. The method of preparing a metal surface for bonding to a brazing or soldering alloy which comprises applying a thin film of metallic indium to said surface, applying to the indium-coated surface a molten lead-base alloy composed of 3% silver and the balance essentially lead and with which the metallic indium alloys in situ, and solidifying the resulting indium-silver-lead alloy while in contact with said metal surface.

MARIA T. LUDWICK.
WILLIAM S. MURRAY.

REFERENCES CITED

The following references are of record in the file of this patent:

UNITED STATES PATENTS

| Number | Name | Date |
|---|---|---|
| 1,684,565 | Waller | Sept. 18, 1928 |
| 1,727,259 | Turnock | Sept. 3, 1929 |
| 1,934,730 | Murray | Nov. 14, 1933 |
| 1,960,740 | Gray | May 29, 1934 |
| 2,123,384 | Silliman | July 12, 1938 |
| 2,157,933 | Hensel | May 9, 1939 |
| 2,288,654 | Smart | July 7, 1942 |